G. W. ALDEN.
Car Wheel.
No. 17,250. Patented May 12, 1857.
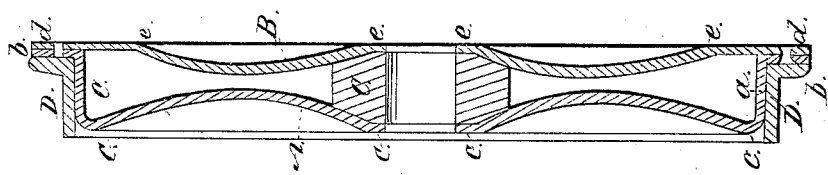
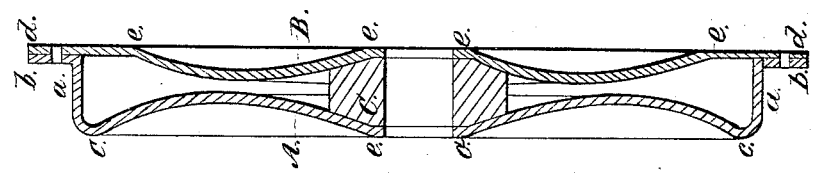
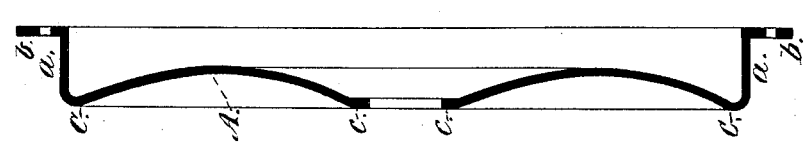

UNITED STATES PATENT OFFICE.

G. W. ALDEN, OF NEW YORK, N. Y.

WROUGHT-IRON-PLATE RAILROAD-CAR WHEEL.

Specification of Letters Patent No. 17,250, dated May 12, 1857.

*To all whom it may concern:*

Be it known that I, G. W. ALDEN, of the city, county, and State of New York, have invented a new and useful Improvement in Railroad-Wheels; and I do hereby declare that the following is a full, clear, and exact description of the same, reference being had to the accompanying drawings.

The invention consists in constructing a railroad wheel of two wrought iron plates, combined with a suitable hub, and united at the flange, as hereinafter described.

Figure 1, in the drawing, represents a section of the front plate of the wheel, parts of which form the tread and half of the flange; said section being taken in a plane passing through the axis. Fig. 2 is a corresponding section of the back plate, parts of which form the other half of the flange. Fig. 3, is a section of the wheel, complete. Fig. 4, is a section of a similar wheel, with the addition of a steel or chilled cast iron tire.

Similar letters of reference indicate corresponding parts in the several figures.

The front plate A, shown in Figs. 1, 3, and 4, and the back plate B, shown in Figs. 2, 3, and 4, are each formed from a suitable sheet or mass of wrought iron by a pressing or stamping operation between suitable dies. Of the front plate, $a$, $a$, is the portion constituting the tread of the wheel; $b$, $b$, is the portion constituting half the flange; and $c$, $c$, is the portion which unites the tread with the hub. Of the back plate, $d$, $d$, is the portion which constitutes half of the flange; and $e$, $e$, the portion which unites the flange and hub. The portions $a$, $b$, $d$, unite to produce the same form as the corresponding portions of other railroad wheels; and the parts $c$, $c$, and $e$, $e$, may be of the same form as the corresponding parts of other double plate wheels, or of any other suitable form; but I generally make both plates concave internally, near the center, or beveling outward toward the center, so that a hub C, of cast or wrought iron, made with two convex or beveled faces, substantially as shown in Figs. 3 and 4, may be firmly confined between them, when the parts $b$, and $d$, constituting the two halves of the flange, are united together. The parts $b$, and $d$, are united by riveting or any equivalent means, by which they can be firmly secured together, so as to give the flange the characteristics of a solid flange.

D, in Fig. 4, is the tire, which is shrunk on in the same manner as the tires of other railroad wheels whose tires are made separate from the other parts of the wheel. The application of the tire involves no change in the construction of the wheel. The tire, however, constitutes no part of the invention, as the wheel is in a measure complete without it.

Instead of providing the wheel with a hub C, as shown in the drawing the whole space between the plates A, B, may be filled with cast iron, which may be poured into it in a molten state, or first cast to the required form.

The wheel constructed as above specified, that is to say, with the two plates A and B, formed and united as described, combines cheapness with great durability.

I do not claim the construction of railroad wheels of two wrought iron plates, united with a hub as described, or of two plates otherwise formed and united than as herein described. But What I do claim as my invention, and desire to secure by Letters-Patent, is:

Constructing the tread and flange of the wheel, and connecting the same with the hub or center thereof, by the combination of the two plates A and B, formed substantially as described, and uniting in the flange of the wheel, as herein specified.

G. W. ALDEN.

Witnesses:
S. H. WALES,
S. F. COHEN.